(12) United States Patent
Sondergaard

(10) Patent No.: US 6,397,577 B1
(45) Date of Patent: Jun. 4, 2002

(54) SHAFTLESS GAS TURBINE ENGINE SPOOL

(75) Inventor: Rolf Sondergaard, Fairborn, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/823,319

(22) Filed: Apr. 2, 2001

(51) Int. Cl.⁷ ................................................ F02C 3/045
(52) U.S. Cl. ........................................ 60/39.43; 415/79
(58) Field of Search .............................. 60/39.43, 804; 415/77, 79

(56) References Cited

U.S. PATENT DOCUMENTS

| 2,423,183 A | * | 7/1947 | Forsyth | 415/79 |
| 2,428,330 A | * | 9/1947 | Heppner | 415/79 |
| 2,548,975 A | * | 4/1951 | Hawthorne | 415/79 |
| 2,651,175 A | * | 9/1953 | Griffith | 415/79 |
| 3,186,166 A | * | 6/1965 | Grieb | 415/79 |
| 3,635,577 A | * | 1/1972 | Dee | 415/79 |
| 5,058,379 A | | 10/1991 | Lardellier | |
| 5,203,164 A | | 4/1993 | Paulson | |
| 5,241,815 A | * | 9/1993 | Lee et al. | 60/39.43 |

FOREIGN PATENT DOCUMENTS

| GB | 577017 | * | 5/1946 | 415/79 |
| GB | 595642 | * | 12/1947 | 415/79 |
| IT | 645672 | * | 9/1962 | 415/79 |

* cited by examiner

*Primary Examiner*—Michael Koczo
(74) *Attorney, Agent, or Firm*—Bobby D. Scearce; Thomas L. Kundert

(57) ABSTRACT

A gas turbine engine structure is described wherein the compressor region and the turbine region of the engine are disposed substantially concentrically of each other between fixed inner and outer casings, with the combustor disposed at one common end of the compressor and turbine, and wherein the rotor components of the engine include one or more rings, bands, housings or casings with the turbine blades and compressor blades mounted respectively on the inner and outer surface thereof, and wherein the compressor and turbine stator components are mounted respectively on the inner surface of the outer casing and the outer surface of the inner casing, or, alternatively, wherein the turbine and compressor stator components are mounted respectively on the inner surface of the outer casing and the outer surface of the inner casing, which structure geometries eliminate much of the weight associated with the disks and interconnecting shafts that characterize conventional engines.

10 Claims, 4 Drawing Sheets

SHAFTLESS GAS TURBINE ENGINE SPOOL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gas turbine engine structures, and more particularly to an improved engine structure wherein the turbine and compressor aerodynamic components are in close proximity, which reduces or eliminates the need for heavy disks and shafts.

In the operation of a gas turbine engine (Brayton cycle engine and its variants), the working fluid (usually air) is compressed to high pressure within one or more compressor stages. Fuel is then added and the fuel-air mixture is burned in a combustor. The hot high pressure combustion gas is expanded through an expansion system comprised of one or more turbine stages. Power extracted from the flow by the expansion system is used to drive the compression system and any external load (viz, propulsive fan in a turbofan engine or drive shaft in a turboshaft engine). Any pressure remaining after expansion through the turbine system may provide direct (core) jet thrust or power to other expansion systems downstream.

Conventional gas turbine engine systems typically comprise a compression system mounted on one or more rotating compressor disks connected to an expansion system mounted separately on one or more rotating turbine disks. One or more drive shafts interconnect the turbine disks and the compressor disks and transfer the required engine operating power from the turbine components to the compressor components. A linked combination of compressor stages, shaft, and turbine stages that all rotate in unison comprises a spool. An engine may have one or more spools, each free to rotate independently, but because multiple spool engines usually require the shafts to be nested, a practical limit of three spools exists, even for large engines. Most engines comprise two spools, and many only one. The design of compressor and turbine aerodynamics is therefore limited because all the components attached to a given spool must rotate at the same speed.

The compressor and turbine components may be of axial flow, radial flow or mixed flow types (combined axial and radial; the term "mixed flow" applies to a stage in which the mean flow surface radius changes from inlet to exit, such as in the first stage of a fan), but the basic topology is invariant. However, because the aerodynamic components that interact with the flow are physically separated, there is significant engine weight associated with the multiple disks and one or more drive shafts required to interconnect them.

Modern turbine engines typically operate at gas temperatures that exceed the material capabilities of the turbine components. The turbine components are cooled by ducting relatively cool air from the high pressure zone of the compressor past the combustor, and the structure required to duct the cooling air adds substantial weight and complexity to the engine.

The invention solves or substantially reduces in critical importance problems with conventional turbine engine structures by providing novel engine topology that places the turbine and compressor aerodynamic components in close axial and radial proximity to each other, which reduces or eliminates the need for heavy disks and shafts and correspondingly reduces the overall length and weight of the engine. By reducing or eliminating the need for shafts, the number of spools is limited only by the number of turbine stages, and turbine and compressor components on a given spool can be better matched aerodynamically. With the compressor and turbine adjacent to each other, ductwork structure providing cooling to the turbine is significantly shortened, may be fully integrated into the bladed ring components, and may be taken from multiple points in the compressor at the pressure needed, which reduces the adverse cycle impact of turbine cooling. The reduction of inertial masses of the rotating components in the improved engine according to the invention allows more rapid speed change, thereby improving engine responsiveness to commanded thrust or power changes. Because the engine structure according to the invention may have a hollow core, secondary engine systems, such as generators and control electronics may be mounted inside the bore of the engine, thus reducing nacelle size requirements.

The invention may be conveniently incorporated into gas turbine power and propulsion systems requiring minimum size or weight, such as in high performance fighter aircraft, helicopters, portable turbine based power systems and small land and sea vehicle power and propulsion systems. The invention may also be retrofitted into existing turbofan/low bypass turbofan engines to reduce noise and increase power and efficiency.

It is therefore a principal object of the invention to provide an improved gas turbine engine.

It is another object of the invention to provide a gas turbine engine structure of size and weight substantially smaller than conventional gas turbine engines of comparable power output.

It is another object of the invention to provide a gas turbine engine structure having a substantially reduced number of disks or shafts.

It is a further object of the invention to provide a shortened gas turbine engine structure.

It is another object of the invention to provide a gas turbine engine structure having improved cooling and reduced cooling requirements to the turbine stage of the engine.

It is a further object of the invention to provide a gas turbine engine structure having improved responsiveness to power and thrust change commands.

These and other objects of the invention will become apparent as a detailed description of representative embodiments proceeds.

SUMMARY OF THE INVENTION

In accordance with the foregoing principles and objects of the invention, a gas turbine engine structure is described wherein the compressor region and the turbine region of the engine are disposed substantially concentrically of each other between fixed inner and outer casings, with the combustor disposed at one common end of the compressor and turbine, and wherein the rotor components of the engine include one or more rings or bands with the turbine blades and compressor blades mounted respectively on the inner and outer surface thereof, and wherein the compressor and turbine stator components are mounted respectively on the inner surface of the outer casing and the outer surface of the inner casing, or, alternatively, wherein the turbine and compressor stator components are mounted respectively on the inner surface of the outer casing and the outer surface of the inner casing, which structure geometries eliminate much of the weight associated with the disks and interconnecting shafts that characterize conventional engines.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
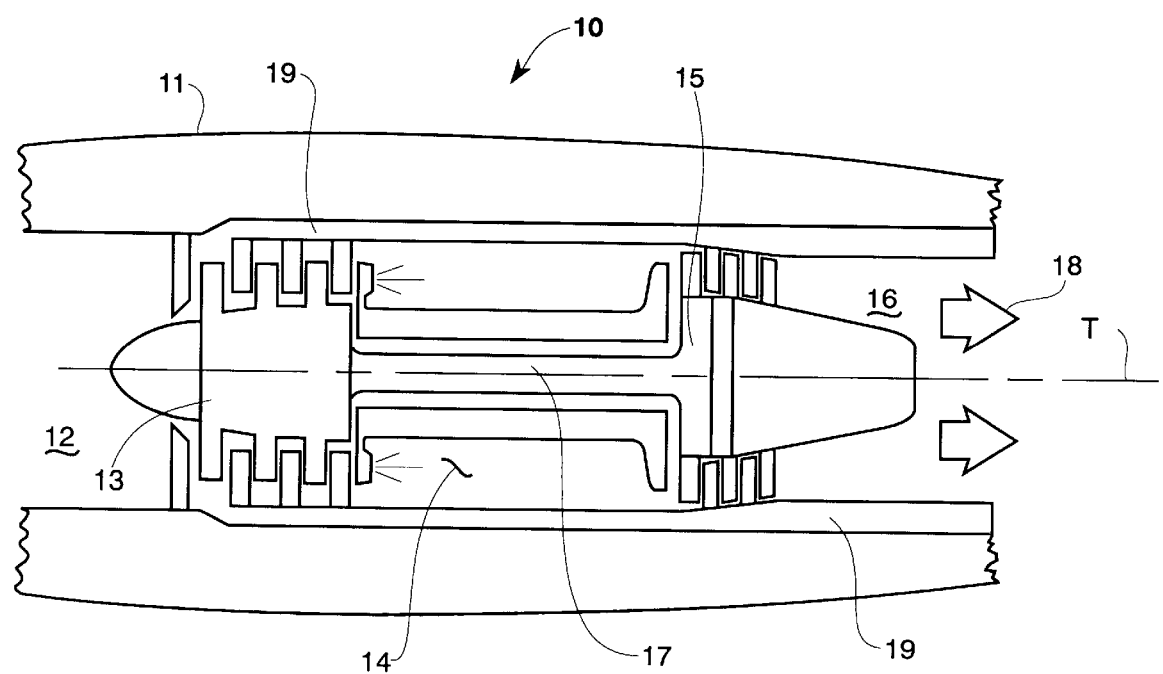
FIG. 1 is a schematic axial sectional view of a typical gas turbine engine structure.

Referring now to the drawings, FIG. 1 shows a schematic axial sectional view of a typical prior art gas turbine engine 10 structure presented here in order to illustrate the operation of a conventional engine and to contrast conventional structure with the invention described herein. Engine 10 typically is supported within housing 11 and includes air inlet and diffuser region 12 for ingesting ambient air, compressor region 13, combustor region 14, turbine region 15, and afterburner and discharge exhaust duct 16. In the operation of engine 10, inlet air is infused into and compressed within compressor region 13, combined with fuel for combustion within combustor region 14, the gaseous products of combustion then driving turbine 15. Turbine 15 is operatively connected to and drives compressor 13 by way of shaft 17, and shaft 17 may be further connected by means such as a drive shaft (not shown) for providing torque or motive power to a separate system (also not shown). Stream 18 of high temperature gaseous combustion products is typically discharged rearwardly along thrust axis T in providing thrust, and in some engines an afterburner is included in order to augment thrust. By-pass air from inlet and diffuser region 12 may typically be ducted as at 19 past the heat generating regions in order to provide cooling to temperature sensitive structural components of engine 10, and/or, usually, as a cold thrust augmenting jet. As suggested above, shaft 17 and the turbine and compressor disks which it interconnects add substantial weight and length to engine 10.

Figure 2:
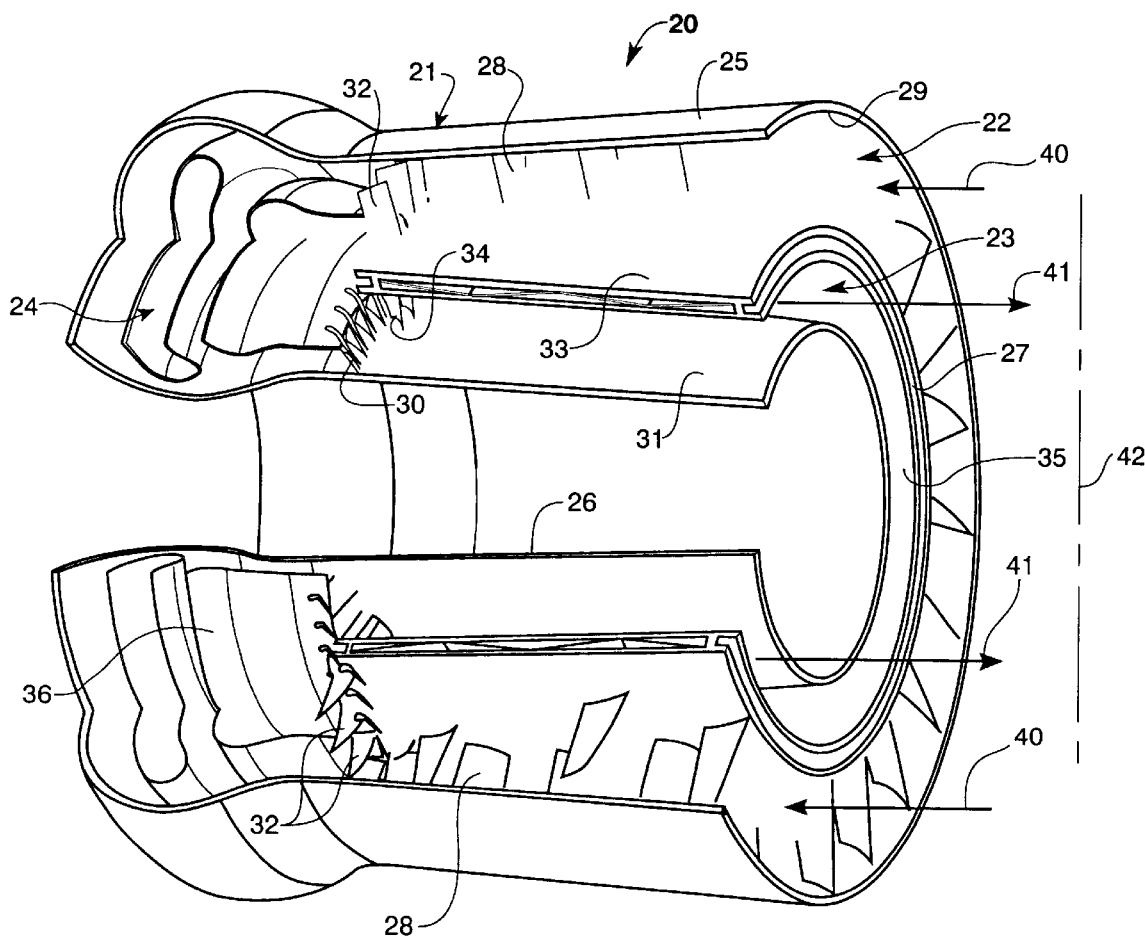
FIG. 2 is a schematic perspective axial view in partial cutaway of an axial segment of a representative embodiment of the engine of the invention showing the concentric compressor and turbine housing structures of the invention and illustrating the placement of the compressor vanes and turbine vanes in the representative embodiment of the invention.
Figure 3:
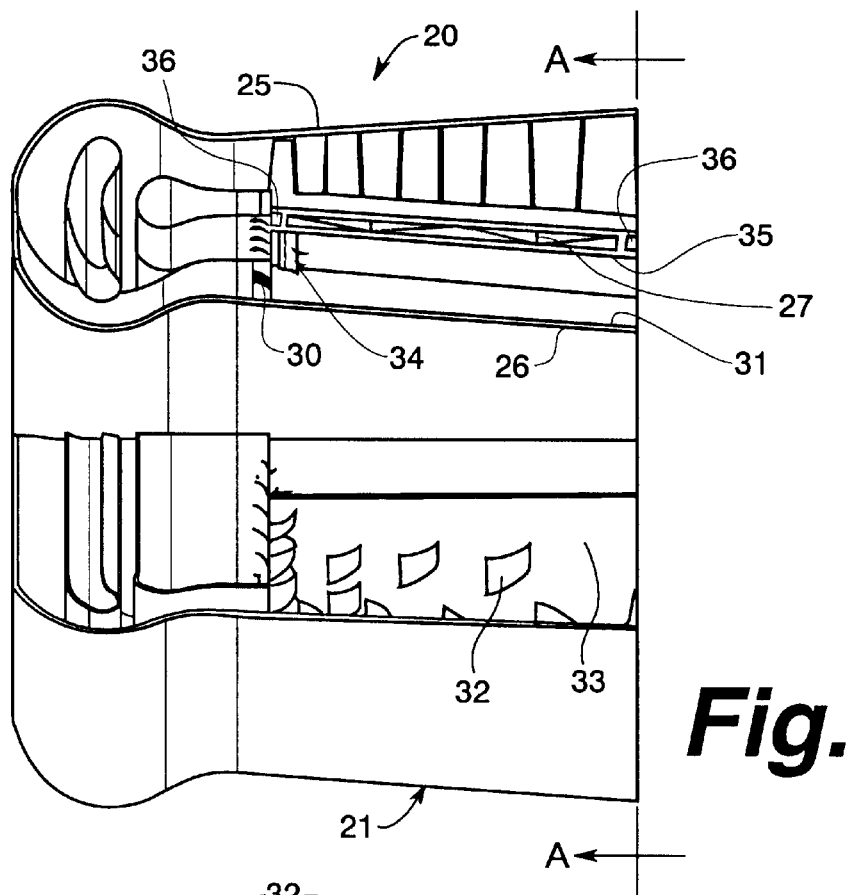
FIG. 3 is a schematic axial sectional view in partial cutaway of the engine segment of FIG. 2 further illustrating the placement of the compressor rotor blades and vanes and the turbine rotor blades and vanes in a representative embodiment of the invention.
Figure 4:
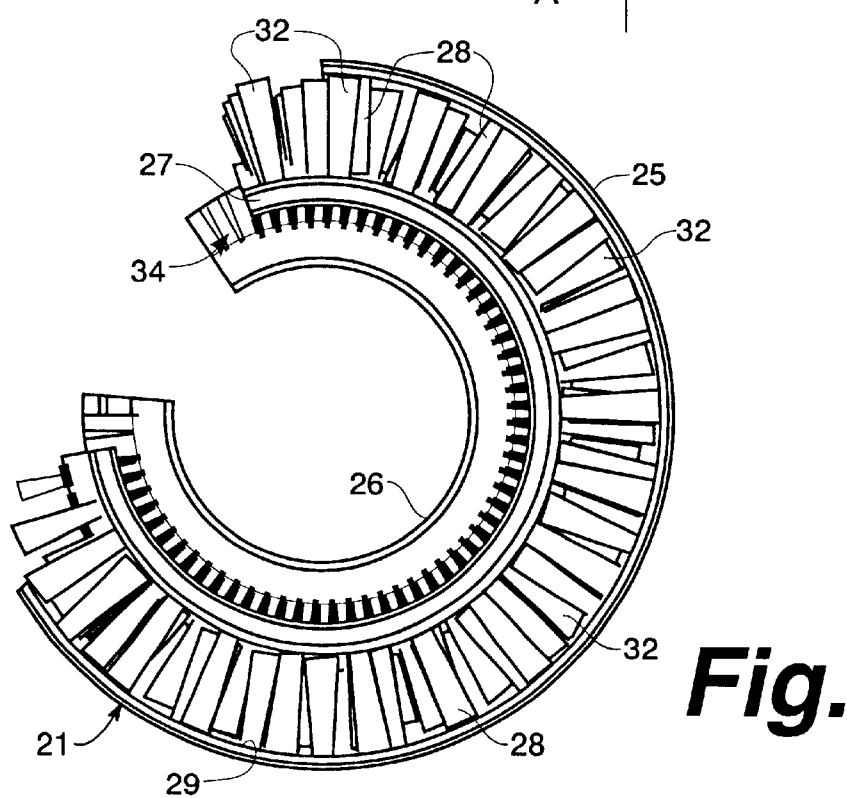
FIG. 4 is a view of the engine segment of FIG. 3 taken in plane A—A.

Referring now to FIG. 2, shown therein is a schematic perspective axial view in partial cutaway of an axial segment 21 of representative engine 20 of the invention showing the concentric compressor and turbine housing structures of the invention and illustrating one preferred placement arrangement of the compressor and turbine vanes and blades. FIG. 3 is a schematic axial sectional view in partial cutaway of the FIG. 2 engine segment further illustrating placement of the compressor rotor blades and vanes and the turbine rotor blades and vanes in a representative embodiment of the invention. FIG. 4 is a view of the engine segment of FIG. 3 taken in plane A—A.

In accordance with a principal feature of the invention, the structure of engine 20 may be viewed as one in which the compressor region 22 has been folded over onto and concentric with turbine region 23. Combustor region 24, which may be in substantially conventional form and structure, resides at the one common end of compressor region 22 and turbine region 23 such as is suggested in FIG. 2.

Accordingly, in a representative embodiment and a preferred structural arrangement for the improved gas turbine engine of the invention, engine 20 may comprise a substantially fixed outer housing or casing 25 and a substantially fixed inner housing or casing 26, and one or more rotatable, generally tubular shaped rings, bands, housings or casings (rotor) 27 disposed between fixed housings 25, 26. Stator vanes 28 for compressor region 22 are mounted to the inner surface 29 of outer casing 25 and stator vanes 30 for turbine region 23 are mounted to the outer surface 31 of inner casing 26. Compressor blades 32 are mounted on the outer surface 33 of rotor 27 in interdigitating relationship with compressor vanes 28, and turbine blades 34 are mounted on the inner surface 35 of rotor 27 in interdigitating relationship with turbine vanes 30.

Rotor 27 may be rotatably journalled at either end thereof within any suitable housing and bearing means, such as represented schematically at 36, as would occur to the skilled artisan in the turbine engine art, the specific rotatable bearing support not considered limiting of the invention herein. Rotor 27 may be operatively connected by any suitable means (such as a drive shaft not shown in FIGS. 2–4) to a separate, external system (also not shown) for providing torque or motive power to the external system.

In the operation of engine 20 of the invention according to the governing principles thereof, air from any suitable air inlet means may be ingested into compressor region 22 as along flow direction 40, compressed within compressor region 22 and directed into combustor 24 for mixing with fuel for combustion. Gaseous products of the combustion process within combustor 24 are expanded through turbine region 23 as along flow direction 41 through turbine vanes and blades 30, 34 to impart rotational energy to rotor 27, which also drives compressor 22.

It is noted that compressor region 22 and turbine region 23 may be reversed in position, that is, the compressor region disposed substantially concentrically within the turbine region, but the high temperature resistant materials and cooling requirements that may be required for the turbine structure may dictate the placement of the compressor region concentrically outside the turbine.

It is further noted that the invention contemplates the attachment of thrust reversal means 42, which may be of any suitable structure for the intended use of engine 20 as would occur to the skilled artisan practicing the invention, to the turbine region 15 at the outlet thereof to selectively reverse the flow 41 back along the central axis of engine 20.

Figure 5:
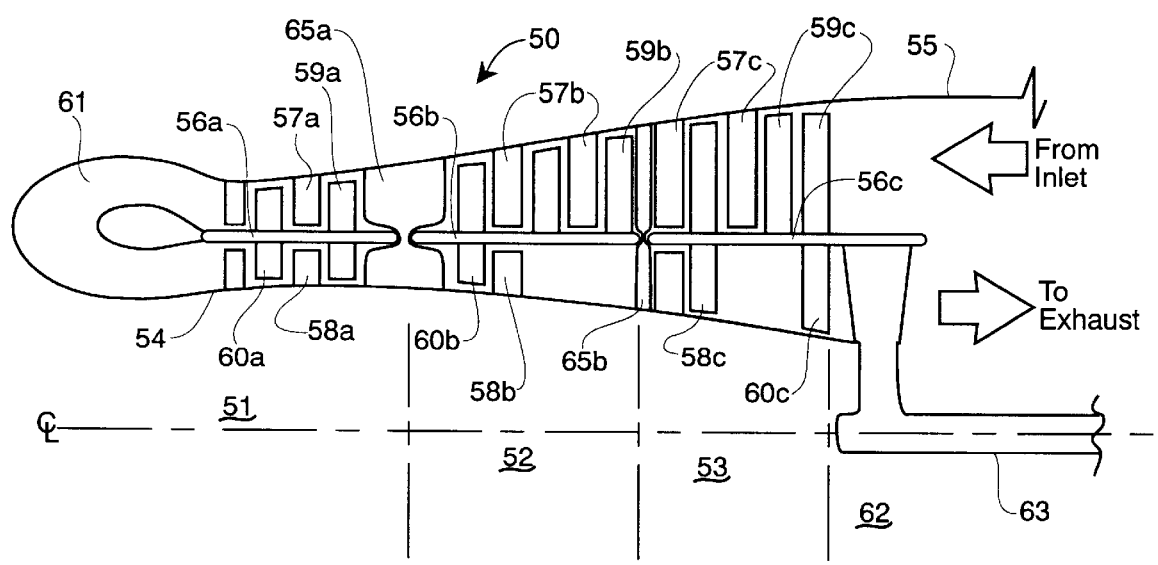
FIG. 5 is a schematic view in axial section of a gas turbine engine having three representative compressor/turbine spools structured according to the invention and disposed axially adjacent each other within the engine.

Referring now to FIG. 5, shown therein is a schematic view in axial section of a gas turbine engine 50 having three representative compressor/turbine spools 51, 52, 53 structured according to the invention and disposed axially adjacent each other within engine 50. Similarly to the structure of FIGS. 2–4, engine 50 may include substantially fixed inner and outer housings 54, 55 within which rotors 56a, 56b, 56c are rotatably disposed. In each of spools 51, 52, 53, respective sets of compressor vanes 57a, 57b, 57c are mounted on the inner surface of outer housing 55, and respective sets of turbine vanes 58a, 58b, 58c are mounted on the outer surface of inner housing 54. Respective sets of compressor blades 59a, 59b, 59c are mounted on the outer surfaces of rotors 56a, 56b, 56c, and respective sets of turbine vanes 60a, 60b, 60c are mounted on the inner surfaces of the rotors. Similarly to engine 20 of FIG. 2, outside air may be ingested from an inlet (not shown) into the compressor regions of engine 50 substantially along the direction of the upper arrow in FIG. 5, and exhaust/thrust gases may be expelled along the direction of the lower arrow. It is contemplated that spool 51, including combustor, would comprise a high pressure spool, and spool 52 and spool 53 (and additional axially disposed spools not shown in FIG. 5) would comprise successively lower pressure spools. As suggested schematically in FIG. 5, the number of compressor stages in each compressor region is ordinarily greater than the number of corresponding turbine stages. Interstage vane and bearing structures 65a, 65b provide means for rotors 56a, 56b, 56c to rotate independently. A power take-off spool 62 typically including a power take-off shaft 63 or the like may be disposed along the centerline of engine 50 and operatively connected to a rotor as suggested in FIG. 5. In addition to advantages attributable to the invention as suggested above or inherent in the structure as would occur to the skilled artisan practicing the invention, the structure suggested in FIG. 5 as incorporating the concentric compressor/turbine spools in an axially disposed configuration allows matching of turbine and compressor performance.

The improved engine geometry defined by the invention described herein eliminates much of the turbine and compressor disk structures and shafts that interconnect the disks in conventional gas turbine engines, which significantly reduces the size and weight of an engine configured according to the invention.

The invention therefore provides an improved gas turbine engine structure of reduced size, weight and complexity and improved responsiveness to thrust and power change commands. It is understood that modifications to the invention as described herein may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A gas turbine engine structure, comprising:
   (a) a first substantially fixed outer housing defined along a substantially central axis of the engine structure;
   (b) a second substantially fixed inner housing disposed substantially coaxially of said outer housing;
   (c) a generally tubular shaped rotor rotatably disposed between said first and second housings, said rotor defining a compressor region of the engine structure between said rotor and one of said first and second housings, and defining a turbine region of the engine between said rotor and the other of said first and second housings;
   (d) a combustor disposed at a first end of said first and second housings and operatively communicating with said turbine region and compressor region;
   (e) a plurality of compressor vanes mounted on one of the inner surface of said outer housing and outer surface of said inner housing, and a plurality of turbine vanes mounted on the other of said inner surface of said outer housing and said outer surface of said inner housing; and
   (f) a plurality of compressor blades mounted on said rotor in interdigitating relationship with said compressor vanes, and a plurality of turbine blades mounted on said rotor in interdigitating relationship with said turbine vanes.

2. The turbine engine structure of claim 1 further comprising means operatively connected to said rotor for providing motive power to an external system.

3. The turbine engine structure of claim 1 further comprising means defining an inlet communicating with said compressor region for ingesting air into said compressor region for mixing with fuel in said combustor.

4. The turbine engine structure of claim 1 further comprising means defining an exhaust region communicating with said turbine region whereby gaseous combustion products from said combustor are expanded through said turbine region to impart rotational energy to said rotor.

5. The engine structure of claim 1 further comprising thrust reversal means operatively connected to the outlet of said turbine region for selectively reversing exhaust gas flow along the centerline of said engine structure.

6. A gas turbine engine structure, comprising:
   (a) a first substantially fixed outer housing defined along a substantially central axis of the engine structure;
   (b) a second substantially fixed inner housing disposed substantially coaxially of said outer housing;
   (c) a generally tubular shaped first rotor rotatably disposed between said first and second housings, said first rotor defining a first compressor region of the engine structure between said first rotor and one of said first and second housings and defining a first turbine region of the engine between said first rotor and the other of said first and second housings;
   (d) a combustor disposed at a first end of said first and second housings and operatively communicating with said first turbine region and said first compressor region;
   (e) a plurality of first compressor vanes mounted on one of the inner surface of said outer housing and outer surface of said inner housing, and a plurality of first turbine vanes mounted on the other of said inner surface of said outer housing and said outer surface of said inner housing;
   (f) a plurality of first compressor blades mounted on said first rotor in interdigitating relationship with said first compressor vanes, and a plurality of first turbine blades mounted on said first rotor in interdigitating relationship with said first turbine vanes;
   (g) at least one generally tubular shaped second rotor rotatably disposed between said first and second housings and axially of said first rotor, said second rotor defining a second compressor region between said second rotor and one of said first and second housings axially of said first compressor region, and defining a second turbine region between said second rotor and the other of said first and second housings axially of said first turbine region;
   (h) a plurality of second compressor vanes mounted on one of the inner surface of said outer housing and outer surface of said inner housing, and a plurality of second turbine vanes mounted on the other of said inner surface of said outer housing and said outer surface of said inner housing; and (i) a plurality of second compressor blades mounted on said second rotor in interdigitating relationship with said second compressor vanes, and a plurality of second turbine blades mounted on said second rotor in interdigitating relationship with said second turbine vanes.

7. The turbine engine structure of claim 6 further comprising means operatively connected to at least one of said rotors for providing motive power to an external system.

8. The turbine engine structure of claim 6 further comprising means defining an inlet communicating with said second compressor region for ingesting air into said first and second compressor regions for mixing with fuel in said combustor.

9. The turbine engine structure of claim 6 further comprising means defining an exhaust region communicating with said second turbine region whereby gaseous combustion products from said combustor are expanded through said first and second turbine regions to impart rotational energy to said rotors.

10. The engine structure of claim 6 further comprising thrust reversal means operatively connected to the outlet of said second turbine region for selectively reversing exhaust gas flow along the centerline of said engine structure.

\* \* \* \* \*